J. S. CULLY.
APPARATUS FOR SEPARATING IMMISCIBLE LIQUIDS.
APPLICATION FILED SEPT. 8, 1914.
1,174,549.
Patented Mar. 7, 1916.
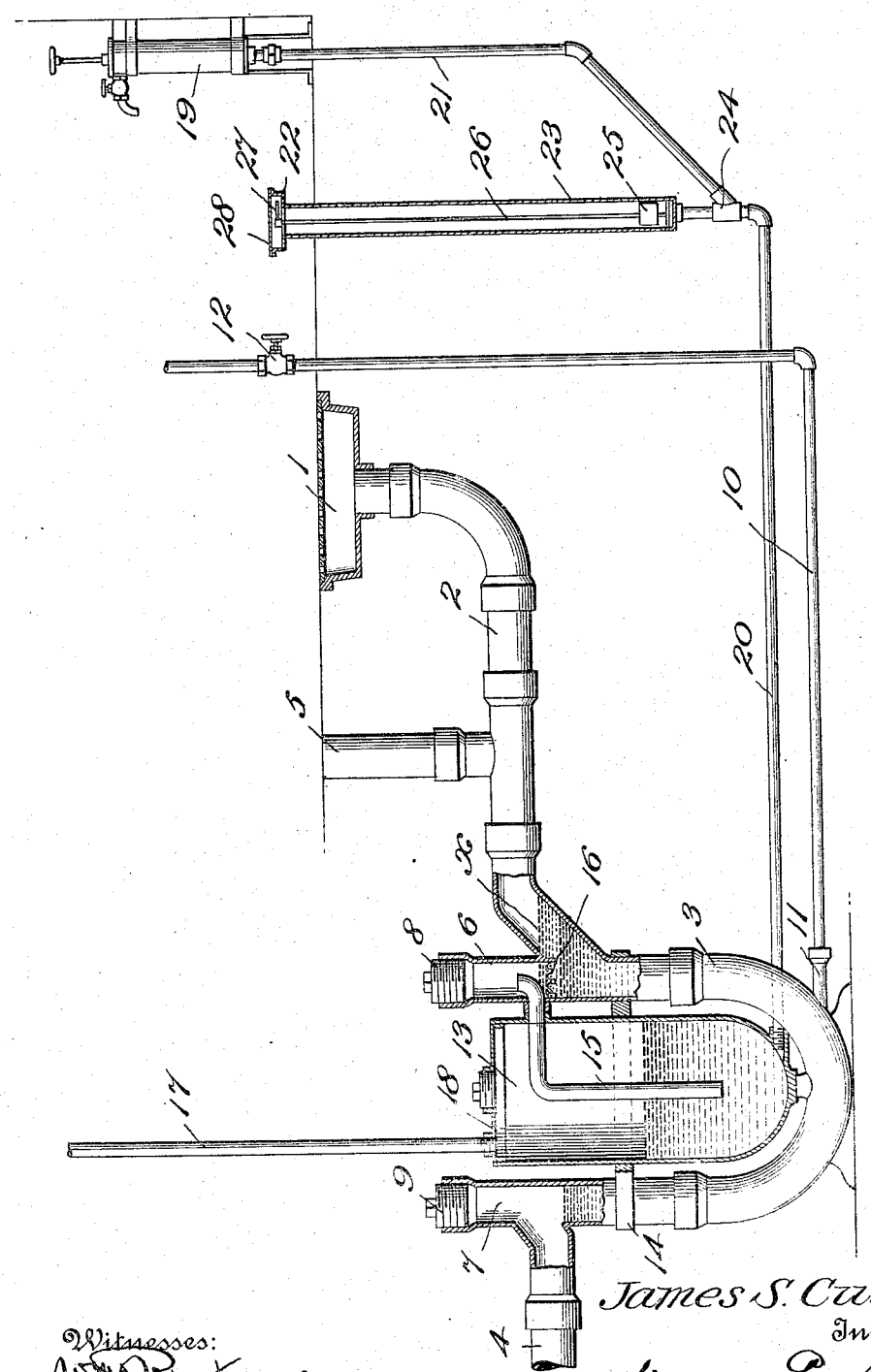
James S. Cully,
Inventor

UNITED STATES PATENT OFFICE.

JAMES S. CULLY, OF NEW YORK, N. Y., ASSIGNOR TO CULLY COMPANY, OF NEW YORK, N. Y., A CORPORATION OF NEW YORK.

APPARATUS FOR SEPARATING IMMISCIBLE LIQUIDS.

1,174,549.  Specification of Letters Patent.  Patented Mar. 7, 1916.

Application filed September 8, 1914. Serial No. 860,723.

*To all whom it may concern:*

Be it known that I, JAMES S. CULLY, citizen of the United States, and resident of New York city, in the county of New York and State of New York, have invented certain new and useful Improvements in Apparatus for Separating Immiscible Liquids, of which the following is a specification.

The present invention relates to apparatus for separating immiscible liquids and consists in the combinations and arrangements of elements described in the following specification and particularly set forth in the accompanying claims.

The invention has for its purpose to provide an apparatus especially adapted for separating and recovering oils from their containing liquids or other substances *e. g.* sewage, drainage from garages, chemical works, machine shops, etc., in a simple and efficient manner, and which will be inexpensive to install and not require personal attention for its operation.

A further purpose of the invention is to provide the oil receiving or recovering vessel with a feeder from the main supply so arranged that an air lock is formed to the end that the oil accumulated in said vessel cannot reënter the main supply in the event of stoppage or other failure in the latter.

Other objects will appear and be better understood from that embodiment of my invention of which the following is a specification, reference being had to the accompanying drawings, forming part hereof, in which the invention is disclosed by way of illustration in the accompanying drawings which shows the apparatus in side elevation, and with portions broken away to show the interior construction.

Referring to the construction in further detail the apparatus consists of a sewage or other drain 1 that delivers into a receiver or pipe 2 having an elbow 3 providing a trap, and having a discharge outlet 4. A vent or branch pipe 5 is tapped into the main 2 and communicates with the atmosphere; and the elbow 3 has extensions 6 and 7, fitted with plugs 8 and 9 respectively, for the purpose of cleaning, as will be understood. A flushing pipe 10 from any source of water supply communicates with the trough of the elbow 3, as at 11, for clearing away solid matter that collects therein; and a regulating valve 12 is mounted on the pipe 10.

A tank 13 is located between the arms of the elbow 3 and is secured therein by the bracket 14, and receives the oil or other lighter liquid from the main 2 that accumulates in the chamber X of the trap. A pipe 15 connects the oil tank 13 with the elbow extension 6 and the latter receives the accumulated oil of flotation from the trap in an obvious manner.

As heretofore stated an essential feature of the apparatus resides in providing a means rendering it impossible for oil delivered into the tank from reëntering the main supply in the possible event of stoppage or other failure in the latter, and to this end the delivery pipe 15 terminates adjacent the bottom of the tank.

A strainer 16 located in the trap prevents the passage of solid matter into the pipe extension 6 and thus entry into the oil delivery 15; and a pipe 17 taps the closed head 18 of the oil tank and brings the latter into communication with the atmosphere.

A manually actuated pump 19 for discharging the tank 13 has connection therewith through the pipes 20 and 21, and a gage 22 is provided for indicating the amount of oil in the tank. Said gage comprises a tube 23 connecting with the coupling 24 of the pipes 20 and 21, and having a float 25 slidably mounted on the spiral or twisted rod 26. The rod 26 has an indicator or hand 27 which together with the dial 28 shows the level of the oil in the vessel 13.

It is obvious that those skilled in the art may vary the details of construction and arrangements of parts without departing from the spirit of my invention and therefore I do not wish to be limited to such features except as may be required by the claims.

What is claimed as new is:—

1. In an apparatus for separating immiscible liquids the combination of a receiver for the substance to be separated providing a closed trap with an extension; said extension adapted to receive the accumulated liquid of flotation, a vessel located adjacent said trap and open to the atmosphere; a pipe providing communication between said vessel and the trap extension; and means for flushing the trap, substantially as described.

2. In an apparatus for separating immiscible liquids the combination of an elbow providing a trap, and having a vertical and closed pipe extension adapted to receive the accumulated liquid of flotation; a vessel located within the elbow and open to the atmosphere; a pipe providing communication between said vessel and the trap extension; and means for flushing the trap, substantially as described.

Signed at New York in the county of New York and State of New York this 27th day of July A. D. 1914.

JAMES S. CULLY.

Witnesses:
Jos. G. ABRAMSON,
WM. T. MACKAY.